(12) United States Patent
Moeller et al.

(10) Patent No.: US 10,189,989 B2
(45) Date of Patent: Jan. 29, 2019

(54) POLYESTER MIXTURE INCLUDING POLYETHYLENE 2,5-FURANDICARBOXYLATE

(71) Applicant: BASF SE, Ludwigshafen (DE)

(72) Inventors: Anna K. Moeller, Griesheim (DE); Kian Molawi, Mannheim (DE); Motonori Yamamoto, Mannheim (DE)

(73) Assignee: BASF SE (DE)

( * ) Notice: Subject to any disclaimer, the term of this patent is extended or adjusted under 35 U.S.C. 154(b) by 0 days.

(21) Appl. No.: 15/300,317

(22) PCT Filed: Mar. 23, 2015

(86) PCT No.: PCT/EP2015/056096
§ 371 (c)(1),
(2) Date: Sep. 29, 2016

(87) PCT Pub. No.: WO2015/150141
PCT Pub. Date: Oct. 8, 2015

(65) Prior Publication Data
US 2017/0183494 A1 Jun. 29, 2017

(30) Foreign Application Priority Data
Apr. 2, 2014 (EP) ..................... 14163169

(51) Int. Cl.
*C08L 67/02* (2006.01)

(52) U.S. Cl.
CPC ........... *C08L 67/02* (2013.01); *C08L 2205/24* (2013.01)

(58) Field of Classification Search
CPC .............................. C08L 67/02; C08L 2205/24
See application file for complete search history.

(56) References Cited

U.S. PATENT DOCUMENTS

| | | | |
|---|---|---|---|
| 5,817,721 A | 10/1998 | Warzelhan et al. | |
| 5,863,991 A | 1/1999 | Warzelhan et al. | |
| 5,880,220 A | 3/1999 | Warzelhan et al. | |
| 5,889,135 A | 3/1999 | Warzelhan et al. | |
| 6,018,004 A | 1/2000 | Warzelhan et al. | |
| 6,046,248 A | 4/2000 | Warzelhan et al. | |
| 6,111,058 A | 8/2000 | Warzelhan et al. | |
| 6,120,895 A | 9/2000 | Kowitz et al. | |
| 6,258,924 B1 | 7/2001 | Warzelhan et al. | |
| 6,353,084 B1 | 3/2002 | Warzelhan et al. | |
| 9,040,639 B2 | 5/2015 | Witt et al. | |
| 9,206,311 B2 | 12/2015 | Steinke et al. | |
| 9,234,073 B2 | 1/2016 | Siegenthaler et al. | |
| 2013/0071588 A1* | 3/2013 | Bastioli | C08G 63/181 428/35.5 |
| 2013/0270212 A1 | 10/2013 | Collias et al. | |

FOREIGN PATENT DOCUMENTS

| | | | | |
|---|---|---|---|---|
| DE | 10303171 A1 * | 8/2004 | ......... | C08G 18/4208 |
| WO | WO-9209654 A2 | 6/1992 | | |
| WO | WO-9615173 A1 | 5/1996 | | |
| WO | WO-9615174 A1 | 5/1996 | | |
| WO | WO-9615175 A1 | 5/1996 | | |
| WO | WO-9615176 A1 | 5/1996 | | |
| WO | WO-9621689 A2 | 7/1996 | | |
| WO | WO-9621690 A1 | 7/1996 | | |
| WO | WO-9621691 A1 | 7/1996 | | |
| WO | WO-9621692 A1 | 7/1996 | | |
| WO | WO-9625446 A1 | 8/1996 | | |
| WO | WO-9625448 A1 | 8/1996 | | |
| WO | WO-9812242 A1 | 3/1998 | | |
| WO | WO-2006097353 A1 | 9/2006 | | |
| WO | WO-2006097354 A1 | 9/2006 | | |
| WO | WO-2007052847 A1 | 5/2007 | | |
| WO | WO-09127556 A1 | 10/2009 | | |
| WO | WO-2009135921 A1 | 11/2009 | | |
| WO | WO-2010034689 A1 | 4/2010 | | |
| WO | WO-2010034711 A1 | 4/2010 | | |
| WO | WO-2010077133 A1 | 7/2010 | | |
| WO | WO-2013062408 A1 | 5/2013 | | |
| WO | WO-2013097013 A1 | 7/2013 | | |

OTHER PUBLICATIONS

Jiang et al; J. Polym. Sci. A: Polym. Chem., 2012, p. 1026-1036.*
Gomes et al; J. Polym. Sci. A: Polym. Chem., 2011, p. 3759-3768.*
Ma et al; J. Mater. Chem., 2012, p. 3457-3461.*
Scheirs et al., "Modern Polyesters: Chemistry and Technology of Polyesters and Copolyesters", pp. 515-520 (2016).
International Search Report for PCT/EP2015/056096 dated May 27, 2015.

* cited by examiner

*Primary Examiner* — Robert S Jones
(74) *Attorney, Agent, or Firm* — Drinker Biddle & Reath LLP

(57) ABSTRACT

The present invention relates to a polyester mixture comprising:

i) from 95 to 99.95% by weight, based on components i and ii, of a polyester selected from the group consisting of: polybutylene terephthalate, polycyclohexylenedimethylene 2,5-furandicarboxylate, polybutylene adipate-co-terephthalate, polybutylene sebacate-co-terephthalate, polybutylene succinate-co-terephthalate, polybutylene 2,5-furandicarboxylate-co-succinate, polybutylene 2,5-furandicarboxylate-co-adipate, polybutylene 2,5-furandicarboxylate-co-azelate, polybutylene 2,5-furandicarboxylate-co-sebacate, polybutylene 2,5-furandicarboxylate-co-brassylate, polybutylene 2,5-furandicarboxylate-co-1,18-$C_{18}$-dicarboxylate, polybutylene succinate, polybutylene adipate, polybutylene succinate-co-adipate, polybutylene succinate-co-sebacate, polybutylene sebacate or mixtures of 2 or more of the polyesters mentioned, and ii) from 0.05 to 5% by weight, based on components i and ii, of polyethylene 2,5-furandicarboxylate.

6 Claims, No Drawings

POLYESTER MIXTURE INCLUDING POLYETHYLENE 2,5-FURANDICARBOXYLATE

CROSS-REFERENCE TO RELATED APPLICATIONS

This application is a national stage application (under 35 U.S.C. § 371) of PCT/EP2015/056096, filed Mar. 23, 2015, which claims benefit of European Application No. 14163169.7, filed Apr. 2, 2014, both applications of which are incorporated herein by reference in their entirety.

The present invention relates to a polyester mixture comprising:
i) from 95 to 99.95% by weight, based on components i and ii, of a polyester selected from the group consisting of: polybutylene terephthalate, polycyclohexylenedimethylene 2,5-furandicarboxylate, polybutylene adipate-co-terephthalate, polybutylene sebacate-co-terephthalate, polybutylene succinate-co-terephthalate, polybutylene 2,5-furandicarboxylate-co-succinate, polybutylene 2,5-furandicarboxylate-co-adipate, polybutylene 2,5-furandicarboxylate-co-azelate, polybutylene 2,5-furandicarboxylate-co-sebacate, polybutylene 2,5-furandicarboxylate-co-brassylate, polybutylene 2,5-furandicarboxylate-co-1,18-$C_{18}$-dicarboxylate, polybutylene succinate, polybutylene adipate, polybutylene succinate-co-adipate, polybutylene succinate-co-sebacate, polybutylene sebacate or mixtures of 2 or more of the polyesters mentioned, and
ii) from 0.05 to 5% by weight, based on components i and ii, of polyethylene 2,5-furandicarboxylate.

BACKGROUND OF THE INVENTION

Polyesters composed of at least one dicarboxylic acid or one dicarboxylic acid derivative and of at least one diol are known from the literature. In particular, polybutylene terephthalate, composed of the aromatic dicarboxylic acid "terephthalic acid", has achieved major economic importance. Biodegradable polyesters are of constantly increasing importance in particular for the packaging of foods, examples being polybutylene adipate-co-terephthalate and polybutylene sebacate-co-terephthalate. Recently, interest has focused on polyesters based on dicarboxylic acids such as succinic acid, sebacic acid, or 2,5-furandicarboxylic acid, or on dials such as 1,4-butanediol, these being obtainable from renewable raw materials.

The use of nucleating agents such as lime or chalk in the polyesters obtainable commercially has been thoroughly studied. Nucleating agents are frequently used in order to accelerate crystallization or to shift the recrystallization point to higher temperatures. In the injection-molding application this permits reduction of cycle times and conservation of resources. Nucleation can also improve the transparency of thin-walled components. In particular, addition of nucleating agents can improve the processability and isolation of polymers, especially amorphous polymers. The use of nucleating agents that are typical for injection-molding applications, for example talc, chalk, or alkali metal salts of carboxylic acids is known (Modern Polyesters: "Chemistry and Technology of Polyesters and Copolyesters" (book by John Scheirs (ed.) and Timothy E. Long (ed.), Wiley-Verlag, published 2003, pp. 515-520). Talc does not always lead to a satisfactory result in the polyesters mentioned in the introduction (component i).

DESCRIPTION OF THE INVENTION

Accordingly, an objective was to find a suitable nucleating agent for the polyesters mentioned in the introduction.

Surprisingly, polyethylene 2,5-furandicarboxylate was found to be a suitable nucleating agent.

The invention is described in greater detail below:

Polyesters composed of at least one dicarboxylic acid or of one dicarboxylic acid derivative, and of at least one dial can be used as component i.

Suitable dicarboxylic acids are aliphatic $C_4$-$C_{18}$-diacids and mixtures thereof, aromatic $C_6$-$C_{14}$-diacids and mixtures thereof, and mixtures of aromatic $C_6$-$C_{14}$- and aliphatic $C_4$-$C_{18}$-diacids. The dicarboxylic acids generally make up more than 50 mol %, preferably more than 70 mol %, and with particular preference more than 99 mol %, of the repeating acid units.

Examples of $C_4$-$C_{18}$-dicarboxylic acids are: succinic acid, glutaric acid, adipic acid, pimelic acid, azelaic acid, sebacic acid, brassylic acid, suberic acid. The dicarboxylic acids or ester-forming derivatives thereof can be used here individually or in the form of mixture of two or more of these.

It is preferable to use succinic acid, adipic acid, azelaic acid, sebacic acid, brassylic acid, or the respective ester-forming derivatives of these, or a mixture thereof. It is particularly preferable to use succinic acid, adipic acid, or sebacic acid, or the respective ester-forming derivatives of these, or a mixture thereof. Another advantage of succinic acid, azelaic acid, sebacic acid, and brassylic acid is that they are obtainable from renewable raw materials.

The expression "aromatic $C_6$-$C_{14}$-dicarboxylic acids" means terephthalic acid or 2,5-furandicarboxylic acid which is likewise obtainable from renewable raw materials.

The expression "acid derivatives" means $C_1$-$C_6$-alkyl esters, and particular preference is given here to the methyl and ethyl esters.

Diols that can be used are aliphatic diols such as ethylene glycol, 1,3-propanediol, 1,4-butanediol and 2,2-dimethyl-1, 3-propanediol (neopentyl glycol). Another advantage of the latter is that they are obtainable in the form of renewable raw material. It is also possible to use mixtures of various alkanediols; the main component is 1,4-butanediol.

Other diols that can be used are cycloaliphatic diols such as 1,4-cyclohexanedimethanol (cis/trans).

Component i is a polyester selected from the group consisting of: polybutylene terephthalate (PBT), polycyclohexylenedimethylene 2,5-furandicarboxylate (PCF), polybutylene adipate-co-terephthalate (PBAT), polybutylene sebacate-co-terephthalate (PBSeT), polybutylene succinate-co-terephthalate (PBST), polybutylene 2,5-furandicarboxylate-co-succinate (PBSF), polybutylene 2,5-furandicarboxylate-co-adipate (PBAF), polybutylene 2,5-furandicarboxylate-co-azelate (PBAzF), polybutylene 2,5-furandicarboxylate-co-sebacate (PBSeF), polybutylene 2,5-furandicarboxylate-co-brassylate (PBBrF), polybutylene 2,5-furandicarboxylate-co-1,18-$C_{18}$-dicarboxylate, polybutylene succinate (PBS), polybutylene adipate (PBA), polybutylene succinate-co-adipate (PBSA), polybutylene succinate-co-sebacate (PBSSe), polybutylene sebacate (PBSe) or mixtures of 2 or more of the polyesters mentioned.

A terephthalic-acid-based aromatic polyester i that can be used is polybutylene terephthalate (PBT) which is obtainable commercially.

An aromatic polyester i based on 2,5-furandicarboxylic acid is polycyclohexylenedimethylene 2,5-furandicarboxylate (PCF), which can be produced as described in WO 2013/062408, WO2010/077133, WO2007/052847.

Polycyclohexylenedimethylene 2,5-furandicarboxylate (PCF) is a semicrystalline polyester which by virtue of its thermal profile is suitable for injection-molding applications. Its Tg is from 86-87° C., its melting point is 267° C., and its recrystallization point is from 217-223° C. For most processing steps (e.g. injection molding) it is advantageous for the thermoplastics used to crystallize from the melt as quickly as possible at temperatures that are as high as possible, in order to keep cycle times low. PCF crystallizes from the melt at a relatively low crystallization rate in comparison with PBT, which is another typical semicrystalline polyester for injection-molding applications. Nucleation is therefore particularly important here.

The expression "terephthalic-acid-based aliphatic-aromatic polyesters i" means polybutylene adipate terephthalate (PBAT), polybutylene sebacate terephthalate (PBSeT), or polybutylene succinate terephthalate (PBST), and very particularly preferably polybutylene adipate terephthalate (PBAT) and polybutylene sebacate terephthalate (PBSeT). Among the suitable aliphatic-aromatic polyesters are linear non-chain-extended polyesters (WO 92/09654). Preference is given to chain-extended and/or branched semiaromatic polyesters. The latter are known from the specifications WO 96/15173 to 15176, 21689 to 21692, 25446, 25448, or WO 98/12242, which are expressly incorporated herein by way of reference. Mixtures of various aliphatic-aromatic polyesters can likewise be used. Recent developments of interest are based on renewable raw materials (see WO-A 2006/097353, WO-A 2006/097354, and also WO2010/034689). The expression "semiaromatic polyesters" in particular means products such as Ecoflex® (BASF SE) and Easter® Bio, and Origo-Bi® (Novamont).

The expression "2,5-furandicarboxylic-acid-based aliphatic-aromatic polyesters i" means polybutylene 2,5-furandicarboxylate-co-succinate, polybutylene 2,5-furandicarboxylate-co-adipate, polybutylene 2,5-furandicarboxylate-co-azelate, polybutylene 2,5-furandicarboxylate-co-sebacate, polybutylene 2,5-furandicarboxylate-co-brassylate, and polybutylene 2,5-furandicarboxylate-co-1,18-$C_{18}$-dicarboxylate.

The expression "aliphatic polyesters i" means polyesters made of aliphatic diols and of aliphatic dicarboxylic acids, for example polybutylene succinate (PBS), polybutylene adipate (PBA), polybutylene succinate adipate (PBSA), polybutylene succinate sebacate (PBSSe), polybutylene sebacate (PBSe), or corresponding polyester amides or polyester urethanes. The aliphatic polyesters are marketed by way of example as Bionolle by the company Showa Highpolymers and as GSPla by the company Mitsubishi. More recent developments are described in WO 2010/034711. Preferred aliphatic polyesters are polybutylene succinate sebacate (PBSSe) and in particular polybutylene succinate (PBS).

The polyesters i generally comprise from 0.01 to 2% by weight, preferably from 0.1 to 1.0% by weight, and with particular preference from 0.1 to 0.3% by weight, based on the total weight of the polyester, of a branching agent, and/or from 0.1 to 1.0% by weight, based on the total weight of the polyester, of a chain extender. The branching agent is preferably selected from the group consisting of: a polyfunctional isocyanate, isocyanurate, oxazoline, epoxide, peroxide, carboxylic anhydride, an at least trihydric alcohol, and an at least tribasic carboxylic acid. Chain extenders that can be used are in particular difunctional isocyanates, isocyanurates, oxazolines, carboxylic anhydride or epoxides.

Particularly preferred branching agents have from three to six functional groups. The following may be mentioned by way of example: tartaric acid, citric acid, maleic acid; trimethylolpropane, trimethylolethane; pentaerythritol; polyether triols and glycerol, trimesic acid, trimellitic acid, trimellitic anhydride, pyromellitic acid, and pyromellitic dianhydride. Preference is given to polyols such as trimethylolpropane, pentaerythritol, and in particular glycerol. Use of the component permits construction of biodegradable polyesters with pseudoplasticity. The biodegradable polyesters are easier to process.

For the purposes of the present invention, the term "diisocyanate" means especially linear or branched alkylene diisocyanates or cycloalkylene diisocyanates having from 2 to 20 carbon atoms, preferably from 3 to 12 carbon atoms, e.g. hexamethylene 1,6-diisocyanate, isophorone diisocyanate, or methylenebis(4-isocyanatocyclohexane). Particularly preferred aliphatic diisocyanates are isophorone diisocyanate and in particular hexamethylene 1,6-diisocyanate.

The expression "polyfunctional epoxides" means in particular a copolymer which is based on styrene, acrylate, and/or methacrylate and which comprises epoxy groups. The units bearing epoxy groups are preferably glycidyl (meth)acrylates. Copolymers that have proven advantageous have a proportion of more than 20% by weight of glycidyl methacrylate in the copolymer, particularly preferably more than 30% by weight, and with particular preference more than 50% by weight. The epoxide equivalent weight (EEW) of these polymers is preferably from 150 to 3000 g/equivalent, and with particular preference from 200 to 500 g/equivalent. The average molecular weight (weight average) $M_w$ of the polymers is preferably from 2000 to 25 000, in particular from 3000 to 8000. The average molecular weight (number average) $M_n$ of the polymers is preferably from 400 to 6000, in particular from 1000 to 4000. Polydispersity (Q) is generally from 1.5 to 5. Copolymers of the abovementioned type comprising epoxy groups are by way of example marketed with trademark Joncryl® ADR by BASF Resins B.V. An example of a particularly suitable chain extender is Joncryl® ADR 4368.

It is generally advisable to add the branching (at least trifunctional) compounds to the polymerization reaction at a relatively early juncture.

The number-average molar mass (Mn) of the polyesters i is generally in the range from 5000 to 100 000 g/mol, in particular in the range from 10 000 to 75 000 g/mol, preferably in the range from 15 000 to 38 000 g/mol, and their weight-average molar mass (Mw) is generally from 30 000 to 300 000 g/mol, preferably from 60 000 to 200 000 g/mol, and their Mw/Mn ratio is generally from 1 to 6, preferably from 2 to 4. Intrinsic viscosity in accordance with ISO 1628-5 (measured in 0.05 g/ml solution in phenol/o-dichlorobenzene (1:1)) is from 50 to 450 mL/g, preferably from 80 to 250 mL/g (measured in o-dichlorobenzene/phenol (ratio by weight 50/50)). Melting point is in the range from 85 to 150° C., preferably in the range from 95 to 140° C.

Polyethylene 2,5-furandicarboxylate (PEF; component ii) has proven to be a suitable nucleating agent. PEF is obtainable in accordance with WO 2013/062408, WO2010/077133, and WO2007/052847.

The quantity of PEF used is generally from 0.05 to 5% by weight, based on components i and ii, and preferably from 0.1 to 2% by weight, based on components i and ii. It is also possible to use larger quantities of PEF, for example 10% by weight. However, in some cases when more than 5% by weight of PEF is used, based on components i and ii, the nucleating effect decreases again.

In one preferred embodiment, PEF is used to accelerate crystallization or to shift the recrystallization point to higher temperatures. In the injection-molding application this permits reduction of cycle times and conservation of resources. Among polyesters i composed of at least one aromatic dicarboxylic acid or one dicarboxylic acid derivative, PEF with intrinsic viscosity (IV) greater than 30 ml/g, preferably greater than 40 ml/g, in accordance with ISO 1628-5 (measured in 0.05 g/ml solution in phenol/o-dichlorobenzene (1:1)) has proven to be particularly advantageous. Among polyesters i composed of at least one aliphatic dicarboxylic acid or one aliphatic and one aromatic dicarboxylic acid, or one corresponding dicarboxylic acid derivative, PEF with intrinsic viscosity (IV) greater than 10 ml/g, preferably greater than 20 ml/g, in accordance with ISO 1628-5 (measured in 0.05 g/ml solution in phenol/o-dichlorobenzene (1:1)) has proven to be particularly advantageous.

As shown in the examples of Table 1, the recrystallization temperature can be greatly increased in aromatic polyesters i such as polycyclohexylenedimethylene 2,5-furandicarboxylate or polybutylene terephthalate. Surprisingly, PEF has markedly greater nucleating effect on the polyesters i than conventional nucleating agents. There is no converse nucleating effect of polycyclohexylenedimethylene 2,5-furandicarboxylate on PEF.

As shown in the examples of Table 2, the recrystallization temperature can also be greatly increased in aliphatic-aromatic polyesters i such as polybutylene sebacate-co-terephthalate or polybutylene adipate-co-terephthalate, or aliphatic polyesters i such as polybutylene succinate or polybutylene succinate-co-sebacate.

Polyesters i such as polybutylene succinate-co-2,5-furandicarboxylate or polybutylene sebacate-co-2,5-furandicarboxylate do not recrystallize without addition of PEF. It is therefore very difficult to isolate these aliphatic-aromatic polyesters after synthesis thereof. Nucleation with PEF causes onset of crystallization even above 100° C., and these polyesters can therefore easily be isolated via pelletization. The nucleation with PEF in the invention therefore also represents an advantageous process for the production and isolation of pelletized polyesters i with little or no tendency toward crystallization. In contrast, PEF has no nucleating effect on polyesters not composed of dicarboxylic acids and of diols, an example being polylactic acid, and this means that no recrystallization point could be determined in DSC even when 1% by weight, 4% by weight or 10% by weight of PEF was added.

A preferred method for the production of a pelletized polyester mixture is as follows:

in a first step, the monomers, in particular:
a) from 20 to 80 mol %, based on the monomers a and b, of an $\alpha,\omega$-$C_4$-$C_{18}$-diacid or of a corresponding diacid derivative;
b) from 20 to 80 mol %, based on the monomers a and b, of a 2,5-furandicarboxylic acid or of a 2,5-furandicarboxylic acid derivative;
c) from 98 to 100 mol %, based on the monomers a and b, of 1,4-butanediol;
are condensed to give a polyester melt i with little tendency toward crystallization;
in a second step, from 0.05 to 5% by weight, based on components i and ii, of polyethylene 2,5-furandicarboxylate (PEF) are added to the polyester melt i, and
in a third step, the polyester mixture is pelletized.

The first step can be carried out by processes known from the literature, batchwise or preferably continuously (see WO 2009/135921). WO2009/127556 describes a preferred continuous process. In a two-stage reaction cascade here, the dicarboxylic acid derivatives are first reacted together with the dial in the presence of a transesterification catalyst to give a prepolyester in a tower reactor, where the condensate is discharged cocurrently. The intrinsic viscosity (IV) of this prepolyester is generally from 50 to 100 mL/g, preferably from 60 to 80 mL/g. Catalysts used are usually zinc catalysts, aluminum catalysts, and in particular titanium catalysts. This prepolyester is polycondensed in a cage reactor and finally chain-extended with hexamethylene diisocyanate (HDI).

In the second step, PEF (component ii) is compounded by way of example in an extruder into the polymer melt. In the preferred continuous process of WO2009/127556, the nucleating agent is preferably added to the polyester melt i before the chain extension with HDI. The PEF can advantageously be added by way of a masterbatch comprising from 5 to 20% by weight of PEF alongside polyester i.

The pelletization (third step) preferably takes place by way of a strand pelletizer or an underwater pelletizer. The polymer melt here is forced through a die. By way of an example, a perforated plate can be used as die. The polymer melt is forced into a cutting chamber flooded with a liquid coolant. The cutting chamber surrounds the die, e.g. the perforated plate, and the apparatus which comminutes the polymer melt. The size and shape of the cutting chamber can in principle be freely selected, and depends on practical considerations, such as the size of the perforated plate, the geometry of the blades, the quantity of coolant to be transported through the cutting chamber, and the throughput of polymer. Water is mostly used as coolant. However, it is also possible to use other coolants, for example mono- or polyhydric alcohols, e.g. glycol, or paraffins.

In one preferred embodiment, the coolant is used at atmospheric pressure. However, in another preferred embodiment, the coolant can also be used under elevated pressure. Finally, the polymer melt is comminuted. Chopper devices such as rotating blades can be provided for this purpose. The manner in which these are attached is generally such that they rotate in the cutting chamber in front of the die, e.g. the heated die plate. The rotation rates are by way of example in the range from 300 to 5000 revolutions per minute.

The periods between the discharge of the polymer melt and the comminution of same are generally very small. In the invention these are no more than 20 ms, preferably no more than 10 ms, in particular no more than 5 ms. The resultant pellets are then cooled. The preferred cooling rate here depends on the nature of the polymer. The cooling rate in the invention is from 2 to 30° C./s, preferably in the range from 5 to 20° C./s, in particular in the range from 8 to 15° C./s. The ratio by volume of pelletized material to coolant during the cooling step is generally from 0.03:1 to 0.12:1, preferably from 0.06:1 to 0.1:1. It is generally preferable that the external temperature of the pellets thereafter is from 80 to 200° C., preferably from 90 to 120° C. It is preferable that the coolant in which the pellets cool is the same as that into which the polymer melt is forced, and in which it is comminuted.

While the pellets are cooling they are preferably simultaneously transported to a drying apparatus. The pellets can by way of example be dried in conventional drying apparatuses of the type described in the technical literature. Examples of suitable drying apparatuses are centrifugal dryers and fluidized-bed dryers.

Performance-Related Tests:

Intrinsic viscosity IV was determined in accordance with ISO 1628-5 of Jan. 3, 1998 in 0.05 g/ml solution in phenol/dichlorobenzene (1:1).

Thermal profiles were measured in a Q2000 differential scanning calorimeter (DSC) from TA Instruments. The heating rate is 20 K/min, and input weight is about 8.5 mg. Flushing gas is helium. The measurement curves are evaluated by a method based on the ISO standard 11357-2 and -3. The temperature of crystallization at the maximum was determined as recrystallization point $T_K$. The temperature of crystallization onset was determined as $T_{KB}$.

All molecular weights were determined by gel permeation chromatography (GPC). The GPC conditions used are as follows: the separation system was operated at 40° C. with flow rate 1 ml/min. Eluent used was hexafluoroisopropanol to which 0.05% of potassium trifluoroacetate had been admixed. Narrowly distributed PMMA standards from the company PSS with molecular weights from M=800 to M=1 820 000 were used for calibration. The values outside of this elution range were extrapolated. All specimens were dissolved in hexafluoroisopropanol to which 0.05% of potassium trifluoroacetate had been admixed. The specimens were then filtered through Millipore Millex FG (0.2 μm), and 500 μL were injected.

The polydispersity index (PDI) of the polymers was determined in accordance with DIN 55672-1; eluent hexafluoroisopropanol (HFIP)+0.05% by weight of potassium trifluoroacetate; narrowly distributed polymethyl methacrylate standards were used for calibration.

A. Starting Materials:

Component i

Polybutylene Terephthalate (PBT)

Ultradur® B2550 (intrinsic viscosity IV=107 ml/g) from BASF SE

Polybutylene adipate-co-terephthalate (PBAT)

Ecoflex® F Blend C 1200 from BASF SE

Polybutylene sebacate-co-terephthalate (PBSeT)

Ecoflex® FS Blend A 1100 from BASF SE

Polybutylene succinate-co-sebacate (PBSSe)

butanediol (89.0 g, 130 mol %), succinic acid (85.3 g, 95 mol %), sebacic acid (7.7 g, 5 mol %), and 0.14 g of glycerol (0.1% by weight) were first heated to 200° C. in the presence of TBOT (0.2 g). The melt was kept at this temperature for 80 min. 1,4-Butanediol was then removed by distillation at reduced pressure (<5 mbar) and at a maximal internal temperature of 250° C. The polyester was decanted and was analyzed after cooling. The intrinsic viscosity of the resultant polyester was 214 mL/g.

Polylactic Acid (PLA—Comparative Polyester)

Ingeo™ 4043D from NatureWorks LLC

Production of polycyclohexylenedimethylene 2,5-furandicarboxylate (PCF)

203.9 g (1.4 mol) of 1,4-cyclohexanedimethanol (cis-trans mixture, cis/trans ratio=30:70) and 257.8 g (1.4 mol) of dimethyl 2,5-furandicarboxylate were weighed into a 1000 ml four-necked flask and flushed with nitrogen. The components were heated to 150° C. under nitrogen and thus melted. At 150° C., 0.28 g (0.8 mmol) of tetra-n-butyl orthotitanate was added. The internal temperature was then raised at 1°/minute to 260° C., and resultant methanol was removed by distillation. Once 260° C. had been reached, the mixture was stirred for a further 30 minutes at 260° C. Vacuum was then applied (<1 mbar), and the melt was stirred at 260° C. The viscosity of the product in the flask rose continuously here until the experiment was terminated after 45 min. 322 g of PCF were isolated.

The intrinsic viscosity of the PCF polymer was 133.4 ml/g.

DSC: $Tg_2$=87° C., Tk=223.0° C., $Tm_2$=267.1° C., ΔH=52 J/g

Production of Polybutylene Succinate (PBS)

82.66 g of succinic acid, 82.01 g of 1,4-butanediol, 0.12 g of glycerol, and 0.06 g of tetrabutyl orthotitanate (TBOT) were used as initial charge in a 250 mL four-necked flask, and the apparatus was flushed with nitrogen. Water was then removed by distillation up to an internal temperature of 220° C. 0.32 g of phosphorus acid and 0.06 g of tetrabutyl orthotitanate were added, vacuum was applied (1 mbar), and the system was further heated to an internal temperature of 270° C. with removal of excess butanediol. Once the desired viscosity had been reached, the system was cooled to room temperature.

IV=127.5 mL/g

Production of poly(butylene succinate-co-furandicarboxylate) (PBSF)

(molar ratio furandicarboxylic acid:succinic acid=70:30)

387.72 g of dimethyl furandicarboxylate, 324.43 g of 1,4-butanediol, and 0.64 g of tetrabutyl orthotitanate (TBOT) were used as initial charge in a 1 L four-necked flask, and the apparatus was flushed with nitrogen. Methanol was removed by distillation up to an internal temperature of 190° C. 106.28 g of succinic acid and 0.60 g of glycerol were then added, and water was removed by distillation up to an internal temperature of 200° C. Vacuum was applied (1 mbar, nitrogen stream), and the system was further heated to an internal temperature of 210° C. in order to remove excess 1,4-butanediol. Once the desired viscosity had been reached the system was cooled to room temperature.

IV=53.1 mL/g; Mn=16 000 g/mol; PDI=2.8

Production of poly(butylene sebacate-co-furandicarboxylate) (PBSeF)

(molar ratio furandicarboxylic acid:sebacic acid=70:30)

128.91 g of dimethyl furandicarboxylate, 69.79 g of sebacic acid, 108.14 g of 1,4-butanediol, 0.22 g of glycerol, and 0.24 g of tetrabutyl orthotitanate (TBOT) were used as initial charge in a 500 mL four-necked flask, and the apparatus was flushed with nitrogen. Methanol was removed by distillation up to an internal temperature of 190° C. Vacuum was applied (1 mbar, nitrogen stream) and the system was further heated to an internal temperature of 210°

C. in order to remove excess 1,4-butanediol. Once the desired viscosity had been achieved, the system was cooled to room temperature.

Mn=24 900 g/mol; PDI=2.9

Component ii:

Production of poly(ethylene furandicarboxylate) (PEF)

Experiment 1:

70.2 g (1.1 mol, 2.5 eq) of ethylene glycol and 82.9 g (0.45 mol, 1 eq) of dimethyl 2,5-furandicarboxylate were weighed into a 250 ml four-necked flask and flushed with nitrogen. The components were heated to 150° C. under nitrogen and thus melted. At 150° C., 0.07 g (0.2 mmol) of tetra-n-butyl orthotitanate was added. The internal temperature was then raised at 1°/minute to 235° C. and resultant methanol was removed by distillation. Once 235° C. had been reached, stirring was continued at 235° C. for a further 30 minutes. 0.07 g (0.1 mmol) of tris(nonylphenyl) phosphite was then added, vacuum was applied (<1 mbar), and the melt was stirred at 240° C. The viscosity of the product in the flask rose continuously here until the experiment was terminated after 80 min. 58 g of PEF were isolated.

The intrinsic viscosity of the PEF polymer in accordance with ISO 1628-5 was 52.4 ml/g.

DSC: $Tg_2$=88° C., no melting point/recrystallization point
GPC: Mn=28 000 g/mol; Mw=77 500 g/mol; PDI=2.1

Experiment 2:

In another experiment, a second batch of PEF was produced by analogy with the process described above. The intrinsic viscosity of the PEF polymer in accordance with ISO 1628-5 was 38.9 ml/g.

Experiment 3:

In another experiment, a third batch of PEF was produced by analogy with the process described above. The intrinsic viscosity of the PEF polymer in accordance with ISO 1628-5 was 30.4 ml/g.

Experiment 4:

In another experiment, a fourth batch of PEF was produced by analogy with the process described above. The intrinsic viscosity of the PEF polymer in accordance with ISO 1628-5 was 14.9 ml/g.

Nucleating Agents (Comparative Systems):

IT Extra talc powder from the company Fisher Scientific

Sodium hypophosphite, sodium benzoate, and sodium stearate from Sigma Aldrich

Carbon black masterbatch composed of 20% by weight of Black Pearls 880 carbon black from Cabot and 80% by weight of Ultradur® B2550 from BASF SE AClyn® 285 from Honeywell: an ionomer (copolymer made of ethylene and sodium acrylate)

B. Production of the Polymer Mixtures:

The polyesters i of Table 1 were extruded with the various nucleating agents in a twin-screw extruder (DSM Midi 2000) at a melt temperature of 280° C., with a residence time of 3 min, and at a rotation rate of 100 rpm. The additives were metered into the system together with the pellets at the cold-feed point. The compounded materials of Table 1 were thus produced.

The various polyesters i of Table 2 were extruded with PEF in a twin-screw extruder (DSM Midi 2000) at a melt temperature of 160° C., 180° C., or 200° C. (PLR), with a residence time of 5 min, and at a rotation rate of 80 rpm. The compounded materials of Table 2 were thus produced.

C. Results

TABLE 1

Recrystallization point $T_K$ and temperature of onset of crystallization $T_{KB}$ (PEF in aromatic polyesters i)

| | Composition [% by wt.] | $T_K$ [° C.] | $T_{kB}$ [° C.] |
|---|---|---|---|
| Reference | 100 of PCF | 216.8 | 234 |
| Comp. example 1a | 99.9 of PCF + 0.1 of talc | 228.9 | 242 |
| Comp. example 1b | 99 of PCF + 1 of talc | 228.3 | 242 |
| Comp. example 1c | 99.5 of PCF + 0.5 of sodium hypophosphite | 218.6 | 235 |
| Comp. example 1d | 98.75 of PCF + 1.25 of carbon black masterbatch | 225.6 | 240 |
| Comp. example 1e | 99 of PCF + 1 of sodium stearate | 223.9 | 238 |
| Comp. example 1f | 99.5 of PCF + 0.5 of sodium benzoate | 222.6 | 238 |
| Comp. example 1g | 99.5 of PCF + 0.5 of AClyn 285 | 221.9 | 236 |
| Inventive example 1 | 99 of PCF + 1 of PEF* | 243.3 | 264 |
| Inventive example 2 | 90 of PCF + 10 of PEF* | 227.9 | 248 |
| Reference | 100 of PBT | 180.0 | 200.8 |
| Inventive example 3 | 99 of PBT + 1 of PEF* | 194.6 | 203 |

The IV of PEF* is 52.4 mL/g

TABLE 2

Recrystallization point $T_K$ and temperature of onset of crystallization $T_{KB}$ (PEF in aliphatic-aromatic and aliphatic polyesters i)

| Examples | PBS [% by wt.] | PBSSe [% by wt.] | PBSF [% by wt.] | PBSeF [% by wt.] | PBSeT [% by wt.] | PBAT [% by wt.] | $PEF_{IV\,30.4}$ [% by wt.] | $PEF_{IV\,14.9}$ [% by wt.] | $T_{extrusion}$ [° C.] | $T_{KB}$ [° C.] | $T_K$ [° C.] |
|---|---|---|---|---|---|---|---|---|---|---|---|
| Ref 4 | 100 | | | | | | 0 | | 180 | 86 | 70 |
| Inv. ex. 4.1 | 99 | | | | | | 1 | | 180 | 91 | 80 |
| Inv. ex. 4.2 | 96 | | | | | | 4 | | 180 | 90 | 77 |
| Inv. ex. 4.3 | 90 | | | | | | 10 | | 180 | 88 | 78 |
| Ref. 5 | | 100 | | | | | 0 | | 180 | 81 | 50 |
| Inv. ex. 5.1 | | 99 | | | | | 1 | | 180 | 84 | 71 |
| Inv. ex. 5.2 | | 96 | | | | | 4 | | 180 | 81 | 66 |
| Inv. ex. 5.3 | | 90 | | | | | 10 | | 180 | 81 | 68 |
| Ref. 6 | | | 100 | | | | 0 | | 160 | — | — |
| Inv. ex. 6.1 | | | 99 | | | | 1 | | 160 | 118 | 78 |

TABLE 2-continued

Recrystallization point $T_K$ and temperature of onset of crystallization $T_{KB}$ (PEF in aliphatic-aromatic and aliphatic polyesters i)

| Examples | PBS [% by wt.] | PBSSe [% by wt.] | PBSF [% by wt.] | PBSeF [% by wt.] | PBSeT [% by wt.] | PBAT [% by wt.] | $PEF_{IV\,30.4}$ [% by wt.] | $PEF_{IV\,14.9}$ [% by wt.] | $T_{extrusion}$ [° C.] | $T_{KB}$ [° C.] | $T_K$ [° C.] |
|---|---|---|---|---|---|---|---|---|---|---|---|
| Inv. ex. 6.2 | | 96 | | | | | | 4 | 160 | 123 | 87 |
| Inv. ex. 6.3 | | 90 | | | | | | 10 | 160 | 127 | 90 |
| Ref. 7 | | | 100 | | | | | 0 | 180 | — | — |
| Inv. ex. 7.1 | | | 99 | | | | | 1 | 180 | 95 | 66 |
| Inv. ex. 7.2 | | | 96 | | | | | 4 | 180 | 116 | 66 |
| Inv. ex. 7.3 | | | 90 | | | | | 10 | 180 | 120 | 68 |
| Ref. 8 | | | | 100 | | | | 0 | 180 | 76 | 60 |
| Inv. ex. 8.1 | | | | 99 | | | | 1 | 180 | 99 | 67 |
| Inv. ex. 8.2 | | | | 96 | | | | 4 | 180 | 105 | 66 |
| Inv. ex. 8.3 | | | | 90 | | | | 10 | 180 | 101 | 66 |
| Ref. 9 | | | | | 100 | | | 0 | 180 | 62 | 38 |
| Inv. ex. 9.1 | | | | | 99 | | | 1 | 180 | 100 | 76 |
| Inv. ex. 9.2 | | | | | 96 | | | 4 | 180 | 105 | 76 |
| Inv. ex. 9.3 | | | | | 90 | | | 10 | 180 | 105 | 75 |

The invention claimed is:

1. A polyester mixture comprising:
   i) from 98 to 99.9% by weight, based on components i and ii, of polycyclohexylenedimethylene 2,5-furandicarboxylate and
   ii) from 0.1 to 2% by weight, based on components i and ii, of polyethylene 2,5-furandicarboxylate.

2. The polyester mixture according to claim 1, wherein the polyethylene 2,5-furandicarboxylate has an intrinsic viscosity of more than 40 ml/g in accordance with ISO 1628-5.

3. The polyester mixture according to claim 1, wherein the polyethylene 2,5-furandicarboxylate with has an intrinsic viscosity of more than 10 ml/g in accordance with ISO 1628-5.

4. The polyester mixture according to claim 1, wherein the polyethylene 2,5-furandicarboxylate has an intrinsic viscosity of from 14.9 ml/g to 52.4 ml/g in accordance with ISO 1628-5 (measured in 0.05 g/ml solution in phenol/o-dichlorobenzene (1:1)).

5. A polyester mixture comprising polycyclohexylenedimethylene 2,5-furandicarboxylate, and 0.05 to 2% by weight of polyethylene 2,5-furandicarboxylate, wherein the polyethylene 2,5-furandicarboxylate has an intrinsic viscosity of from 14.9 ml/g to 52.4 ml/g in accordance with ISO 1628-5 (measured in 0.05 g/ml solution in phenol/o-dichlorobenzene (1:1)).

6. A polyester mixture comprising:
   i) from 95 to 99.95% by weight, based on components i and ii, of a polycyclohexylenedimethylene 2,5-furandicarboxylate, and
   ii) from 0.05 to 5% by weight, based on components i and ii, of polyethylene 2,5-furandicarboxylate.

* * * * *